(12) United States Patent
Nguyen et al.

(10) Patent No.: US 9,219,967 B2
(45) Date of Patent: Dec. 22, 2015

(54) MULTIUSER AUDIOVISUAL CONTROL

(71) Applicant: EchoStar Technologies, L.L.C., Englewood, CO (US)

(72) Inventors: Phuc H. Nguyen, Parker, CO (US); Christopher William Bruhn, Aurora, CO (US)

(73) Assignee: EchoStar Technologies, L.L.C., Englewood, CO (US)

( * ) Notice: Subject to any disclaimer, the term of this patent is extended or adjusted under 35 U.S.C. 154(b) by 204 days.

(21) Appl. No.: 14/088,697

(22) Filed: Nov. 25, 2013

(65) Prior Publication Data

US 2015/0146879 A1    May 28, 2015

(51) Int. Cl.
*H04R 1/10* (2006.01)
*H04R 27/00* (2006.01)

(52) U.S. Cl.
CPC .............. *H04R 27/00* (2013.01); *H04R 1/1041* (2013.01); *H04R 2499/15* (2013.01)

(58) Field of Classification Search
CPC ... H04R 1/1041; H04R 27/00; H04R 2499/15
USPC ................ 381/74, 77, 81, 123, 182, 306, 370
See application file for complete search history.

(56) References Cited

U.S. PATENT DOCUMENTS 5,596,647 A * 1/1997 Wakai et al. .................... 381/77
2014/0362201 A1 12/2014 Nguyen et al.

* cited by examiner

*Primary Examiner* — Paul S Kim
(74) *Attorney, Agent, or Firm* — Kilpatrick Townsend & Stockton LLP

(57) ABSTRACT

Various audiovisual presentation arrangements are described. In some embodiments, a headset is configured to output audio to a user. A television receiver may be configured to output a plurality of video feeds for simultaneous presentation by a display device. Each video feed of the plurality of video feeds may be displayed in a different display region of the display device. The television receiver may receive a command indicative of a video feed of the plurality of videos feeds that the user is viewing on the display device. Based on the command, the television receiver may output, to the headset, an audio feed that corresponds to the video feed the user is viewing.

18 Claims, 9 Drawing Sheets

MULTIUSER AUDIOVISUAL CONTROL

CROSS REFERENCES TO RELATED APPLICATIONS

This application is related to U.S. patent application Ser. No. 13/910,804, entitled "Apparatus, Method and Article for Providing Audio of Different Programs," filed Jun. 5, 2013, the entire disclosure of which is hereby incorporated by reference for all purposes.

BACKGROUND

The sensation of a television viewer being forced to watch or listen to television programming other than what is desired is a well-known feeling to many television viewers. For instance, in a sports bar, the proprietor may attempt to alleviate this condition by having multiple televisions tuned to different television channels in an attempt to make as many patrons satisfied as possible. However, audio may be played throughout the bar that accompanies a particular television channel or competing audio may be played aloud for multiple television channels. For at least some patrons, the audio they are forced to listen to may be other than what is desired. Similar situations may occur in workout gyms, homes, or any other situation where multiple viewers have differing programming tastes.

SUMMARY

In some embodiments, an audiovisual control system is presented. The audiovisual control system may include a receiving device. The receiving device may be configured to receive a first command selecting a first video feed of a plurality of video feeds that a first user is viewing on a display device. The receiving device may be configured to, based on the first command, output a first audio feed that corresponds to the first video feed the first user is viewing, wherein the first audio feed is output to a first headphone device. The receiving device may be configured to receive a second command indicative of a change command from the first user corresponding to the first video feed. The receiving device may be configured to determine whether a second user is viewing the first video feed. The receiving device may be configured to, in response to determining whether the second user is viewing the first video feed, process the change command.

Embodiments of such an audiovisual control system may include one or more of the following: The audiovisual control system may include a television receiver configured to output the plurality of video feeds for simultaneous presentation by the display device, wherein each video feed of the plurality of video feeds is displayed in a different display region of the display device. The receiving device may be integrated as part of the television receiver. The receiving device may be further configured to receive a third command indicative of a second video feed of the plurality of video feeds that the second user is viewing on the display device. The receiving device may be further configured to, based on the third command, output a second audio feed that corresponds to the second video feed the second user is viewing, wherein the second audio feed is output to a second headphone device. No other user may be viewing the first video feed. The receiving device may be further configured to, in response to determining that no other user is viewing the first video feed, change the first video feed to a new video feed based on the change command.

Additionally or alternatively, embodiments of such an audiovisual control system may include one or more of the following: The second user may be viewing the first video feed. The receiving device may be further configured to, in response to determining that the second user is viewing the first video feed, output an indication that the first video feed will not be changed based on the change command received from the first user. The receiving device may be further configured to, in response to determining that the second user is viewing the first video feed, discard the change command received from the first user.

Additionally or alternatively, embodiments of such an audiovisual control system may include one or more of the following: The audiovisual control system may include a first headphone device configured to output audio to the first user wherein the first headphone device comprises a plurality of buttons. The first headphone device may be configured to receive, via a button of the plurality of buttons of the first headphone device, user input indicative of the first video feed of the plurality of video feeds; and transmit the first command based on the user input. The audiovisual control system may include a mobile device. The mobile device may be configured to: receive user input indicative of the first video feed of the plurality of video feeds; and transmit the first command based on the user input to the receiving device via a network connection. The first headphone device may include an accelerometer and the first headphone device may be configured to: receive, via the accelerometer, user input indicative of the first video feed of the plurality of video feeds; and transmit the first command based on the user input. The audiovisual control system may include a camera having a field of view including the first user, wherein a television receiver is further configured to: receive one or more images from the camera; and determine, using the one or more images, a display region of the display device that the first user is viewing; wherein the gaze of the first user is used as the first command.

In some embodiments, a method for managing multiple video streams is presented. The method may include receiving, by a computerized receiving device, a first command selecting a first video feed of a plurality of video feeds that a first user is viewing on a display device. The method may include, based on the first command, outputting, by the computerized receiving device, a first audio feed that corresponds to the first video feed the first user is viewing, wherein the first audio feed is output to a first headphone device. The method may include receiving, by the computerized receiving device, a second command indicative of a change command from the first user corresponding to the first video feed. The method may include determining, by the computerized receiving device, whether a second user is viewing the first video feed. The method may include, in response to determining whether the second user is viewing the first video feed, processing, by the computerized receiving device, the change command.

Embodiments of such a method may include one or more of the following: The method may include output the plurality of video feeds for simultaneous presentation by the display device, wherein each video feed of the plurality of video feeds is displayed in a different display region of the display device. The computerized receiving device may be integrated as part of the television receiver. The method may include receiving, by the computerized receiving device, a third command indicative of a second video feed of the plurality of video feeds that the second user is viewing on the display device. The method may include, based on the third command, outputting, by the computerized receiving device, a second audio feed that corresponds to the second video feed the second user is viewing, wherein the second audio feed is output to a second headphone device.

Additionally or alternatively, embodiments of such a method may include one or more of the following: No other user may be viewing the first video feed. The method may include, in response to determining that no other user is viewing the first video feed, changing, by the computerized receiving device, the first video feed to a new video feed based on the change command. The second user may be viewing the first video feed. The method may include in response to determining that the second user is viewing the first video feed, outputting, by the computerized receiving device, an indication that the first video feed will not be changed based on the change command received from the first user. The method may include in response to determining that the second user is viewing the first video feed, discarding, by the computerized receiving device, the change command received from the first user. The method may include receiving, by an accelerometer of a headphone device, user input indicative of the first video feed of the plurality of video feeds. The method may include transmitting, by the headphone device, the first command based on the user input.

In some embodiments, a non-transitory processor-readable medium for managing multiple video streams is presented. The non-transitory processor-readable medium may include processor-readable instructions configured to cause one or more processors to receive a first command selecting a first video feed of a plurality of video feeds that a first user is viewing on a display device. The instructions may further cause the one or more processors to, based on the first command, output a first audio feed that corresponds to the first video feed the first user is viewing, wherein the first audio feed is output to a first headphone device. The instructions may further cause the one or more processors to receive a second command indicative of a change command from the first user corresponding to the first video feed. The instructions may further cause the one or more processors to determine whether a second user is viewing the first video feed. The instructions may further cause the one or more processors to, in response to determining whether the second user is viewing the first video feed, process the change command.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

A television receiver may be configured to output for presentation multiple video feeds simultaneously. These multiple video feeds may be displayed using a single display device (e.g., with different portions of the display device displaying the video feeds) or multiple display devices. As detailed in U.S. patent application Ser. No. 13/910,804, which is incorporated by reference, depending on which video stream a user desires to watch, a corresponding audio stream may be output to a headset of the user. Therefore, the user listens to only the audio stream corresponding to the video stream that the user is currently watching; other users may be listening to one or more other audio streams. Such an arrangement may allow multiple users to simultaneously view and listen to different audiovisual content (e.g., live television content broadcasts, on-demand content, recorded content, streaming content, video games) without having to listen to interfering audio streams. Such an arrangement may also be particularly useful in places where competing interests for content exist, such as among patrons at bars and restaurants or among family members watching television together.

While such arrangements may allow multiple users to view and listen to different audiovisual content simultaneously without significantly disturbing each other, it may be additionally useful for the users to each be able to control output of the audiovisual content without negatively affecting other users. For instance, when four users are present in a room, a television receiver and display device may be configured to simultaneously output four pieces of content. Each user may be permitted to change each piece of content being output as long as another user is not viewing that particular piece of content. A receiving device, which may be part of a television receiver or may be separate, may monitor which pieces of audiovisual content are being watched by users. If a piece of content is being watched by only a single user, that single user may be permitted to change the content (e.g., change to a different channel, stop playback of the content, rewind the content, fast forward the content) without being blocked or requiring permission from another user. If the piece of content is being watched by multiple users, the user may be blocked from changing the piece of content, but may be permitted to perform other functions that do not change the content (e.g., pause). In some embodiments, if a user attempts to change a piece of content that is being watched by multiple users, the other users may be prompted to either allow or block the change command. If allowed, the user's change command may be processed; if blocked, the user's change command may be ignored.

Figure 1:
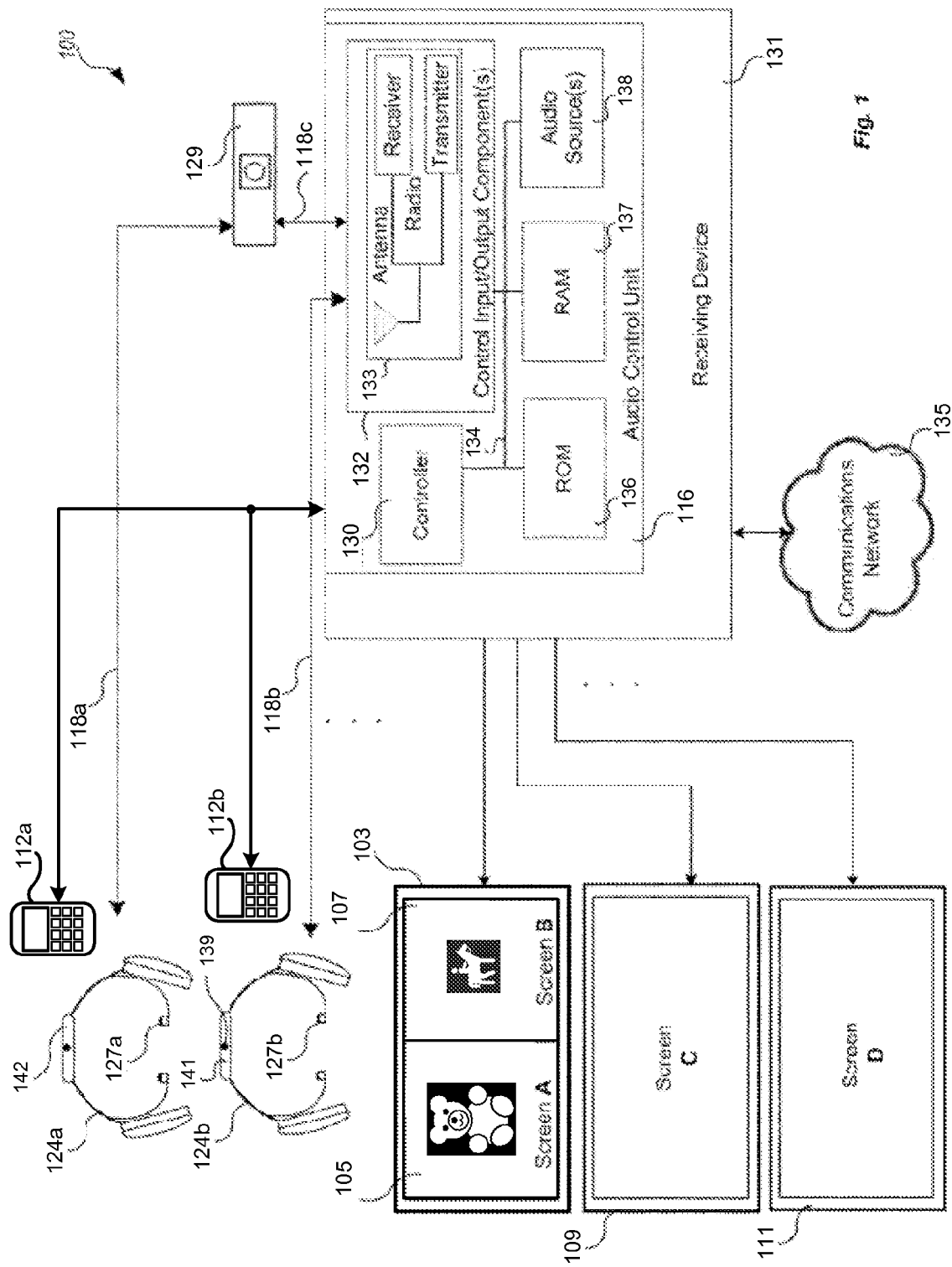
FIG. 1 illustrates an embodiment of an audiovisual presentation system.

An audiovisual control system that permits multiple users to control the content output for presentation may be implemented using system 100 of FIG. 1. FIG. 1 is a diagram of an embodiment of system 100 for providing audio of different content. Processes and techniques are provided for two or more different users to independently view and listen to two or more different pieces of content 105 and 107 being displayed concurrently on the same display device 103 (e.g., in a split screen mode) or on multiple displays 109 and 111. For example, this may be performed by sending the audio signal via communication link or communication channel 118*a* or 118*b* of one of the pieces of content being displayed to corresponding headphone device 124*a* or 124*b* of the user currently looking at that piece of content on display device 103. For example, in one embodiment, the audio signal sent via communication link or communication channel 118a is carrying the audio stream of the piece of content the user of headphone device 124a is looking at and the audio signal sent via the communication link or communication channel 118b is carrying the audio stream of the piece of content the user of headphone device 124b is looking at.

In some embodiments, the headphone devices 124a and/or 124b include at least one camera 127a or 127b or other eye-tracking device mounted on the corresponding headphone device 124a or 124b that is positioned to detect and/or track eye movements and/or eye positions of the user wearing the headphone device 124a or 124b. Such a tracking device may be used to determine which piece of content the user wearing the corresponding headphone device 124a or 124b is currently looking at. When the user looks at the other piece of content being displayed on the display device 103 (or display devices 109 or 111 visible by the user), the system can detect that the user has switched to viewing the other piece of content. An audio stream of that other piece of content may then be streamed to the user's headphone device 124a or 124b.

Headphone device 124a has a headphone device controller 142 and headphone device 124b has headphone device controller 141 to process and act on input signals to their respective headphone devices 124a and 124b to facilitate implementation of the above processes. The receiving device 131 may be in operable communication with a communications network 135. Content may be communicated from a program distributor or content provider through suitable communication media, generally illustrated as communications network 135 for convenience. Communications network 135 may include many different types of communication media including those utilized by various different physical and logical channels of communication. Non-limiting media and communication channel examples include one or more, or any operable combination of: telephone systems, the Internet, cable systems, fiber optic systems, microwave systems, asynchronous transfer mode ("ATM") systems, frame relay systems, digital subscriber line ("DSL") systems, radio frequency ("RF") systems, cellular systems, and satellite systems.

In various example embodiments, the receiving device may be incorporated as part of a television receiver, which may be implemented as a set top box (STB). The receiving device may be any suitable converter device or electronic equipment that is operable to receive programming. The receiving device may also be a stand-alone device that communicates with a television receiver. For example, a television receiver may output multiple video streams and may output multiple audio streams to the receiving device. The receiving device may then relay the appropriate audio streams to headphone devices 124a and 124b. Further, the receiving device may relay commands, such as change commands, to the television receiver. Further, the receiving device may itself include user interface devices, such as buttons or switches. However, In some embodiments, the receiving device 131 may be a recording device or other media player that outputs content that has not been received by the receiving device 131 via communications network 135 and, in some embodiments, need not have functionality to receive content from some or all external sources.

In some embodiments, the audio stream may instead or also be sent to and/or through other devices over various networks, channels and/or signal paths, such as via corresponding communication channels 118a, 118b and/or 118c and/or via communications network 135. For example, instead of or in addition to sending the audio stream of the piece of content that the user is currently looking at to the headphone device of the user (e.g., headphone device 124a), the audio signal of the piece of content the user is currently looking at may be sent to one or more other devices of the user, including, but not limited to, one or more of: a smartphone device, a tablet device, a mobile computing device, a computer, a speaker system, an entertainment system, a game console, a gaming device, a virtual reality system, etc. This audio signal may be sent via a communication channel such as corresponding communication channels 118a and/or 118b and/or via communications network 135 which may connect to a remote system. As another example, in an embodiment where there is only a single user detected by the camera 129, receiving device 131 or other device, the audio stream may instead or also be sent to the normal non-headphone device speakers (not shown) of the system 100 and/or to another device of the user, including, but not limited to, one or more of: a smartphone device, a tablet device, a mobile computing device, a computer, a speaker system, an entertainment system, a game console, a gaming device, a virtual reality system, etc. The communication channels 118a, 118b, and/or 118c may be wired or wireless.

The receiving device 131 may include a controller 130, control input and output components 132, read-only memory (ROM) 136, random access memory (RAM) 137 and audio sources 138 to enable the system to provide the different audio sources according to which piece of content the user is currently looking at. The controller 130 of the audio control unit 116 and the headphone device controller 142 may be a microprocessor, microcontroller, programmable logic controller (PLC), programmable gate array (PGA), application specific integrated circuit (ASIC) or another controller capable of sending signals to various outputs (including the control input and output components 132), performing logical operations, and sending signals to various other components. Typically, the controller 130 may take the form of a microprocessor (e.g., x86, MIPS, ARM, etc.). As shown, the audio control unit 116 may also include one or more non-transitory processor- or computer-readable storage media, for example read-only ROM 136 and RAM 137. The non-transitory processor- or computer-readable storage media ROM 136 and RAM 137 may be in addition to any non-transitory storage medium (e.g., registers) which is part of the controller 130. As shown, the audio control unit 116 may also include one or more buses 134 (only one illustrated) coupling various components together, for example one or more power buses, instruction buses, data buses, etc. As illustrated, the ROM 136 and RAM 137 store instructions and/or data or values for variables or parameters. The sets of data may take a variety of forms, for example a lookup table, a set of records in a database, etc. The instructions and sets of data or values are executable by the controller 130. Execution of such causes the controller 130 to perform specific acts to cause the selection, generating and/or transmitting of a first electrical or other electromagnetic signal representing audio associated with the first piece of content 105 and selection, generating and/or transmitting of a second electrical or other electromagnetic signal representing audio associated with the second piece of content 107. Such selection, generating and/or transmitting of additional audio signals may also be performed. In some embodiments, the first electrical signal and second electrical signal are encoded individually into one signal. Also, one or both of the first electrical signal and the second electrical signal may be a wireless signal.

Execution of instructions by the controller 130 may also cause the controller 130 to perform specific acts to cause the audio control unit 116 to receive, format, interpret, process and/or make decisions regarding received information indicative of one or more of: a position of the user's head, a position of the user's eyes, a user's gaze, a direction in which the user's eyes are looking, movements of the user, movements of the user's eyes, gestures of the user, facial features identifying a particular user or users, facial recognition, user profile information, etc. For example, such data may be received via the wired or wireless communication channels 118a, 118b and/or 118c between the audio control unit 116, the headphone devices 124a, 124b, and/or the camera 129. In some embodiments, execution of instructions by the controller 130 may cause the controller 130 to perform specific acts to cause the audio control unit 116 to determine which piece of content the viewer wearing a headphone device (e.g., headphone device 124a) is currently looking at. When the user looks at a particular piece of content being displayed on the display device 103 (or display devices 109 or 111 visible by the user), the execution of instructions by the controller 130 may cause the controller 130 to switch to select the audio signal of that particular piece of content and send the audio signal of that particular piece of content to the headphone device 124a via communication channel 118a from the control input and output component(s) 132 of the audio control unit 116. The audio control unit 116 may include one or more radio transceiver devices such as radio transceiver device 133 to receive and send wireless signals of communication channels 118a, 118b and/or 118c, and/or receive and send wireless signals between audio control unit 116 and communications network 135. In some embodiments, the radio transceiver device 133 may be located outside the audio control unit 116 or receiving device 131, but is in operable communication with the audio control unit 116 and/or receiving device 131. In the example embodiment shown in FIG. 1, communication channel 118a is between the control input and output component(s) 132 of the audio control unit 116 and headphone device 124a. However, the communication channels 118a and 118b may include active and/or passive communication channels or segments between and/or through any of the devices and/or components shown in FIG. 1 and the corresponding headphone device 124a or 124b in order to communicate applicable information between such devices. For example, communication channel 118c is shown in FIG. 1 as being between input and output component(s) 132 of the audio control unit 116 and the camera 129, and communication channel 118a is shown as being between the camera 129 and the headphone device 124a.

The audio control unit 116 may also perform an initialization and/or calibration process with the camera 129 alone or in conjunction with the headphone devices 124a and 124b. For example, when a camera device external to the headphone devices 124a and 124b is used to detect movement of one or more users' eyes or other gestures of one or more users, an initialization or calibration process may include the user wearing a particular headphone device (e.g., headphone device 124b) and causing the headphone device 124b to be identified by the audio control unit 116 by use of an identifier of the headphone device 124b being communicated from the headphone device 124b. This identifier may be communicated via wired or wireless communication channel 118b (or other wired or wireless communication channel, such as those described herein) to the control input output component(s) 132 of the audio control unit 116 and/or the camera 129. For example, this may be communicated via an infrared (IR) or other radio frequency (RF) or electromagnetic signal modulated to communicate the identifier of the headphone device 124b from the headphone device 124b to the control input output component(s) 132 of the audio control unit 116 and/or the external camera 129. In one embodiment, the receiving device 131 and/or headphone device controller (e.g., headphone device controller 141 of headphone device 124b) assigns a unique frequency/modulation to an IR light emitting diode (LED) built into the headphone device 124b, (such as LED 139) upon pairing with the audio control unit 116. Then the camera 129 identifies the headphone device 124b based on seeing this unique frequency/modulation. In another embodiment, users may assign their headphone devices 124a and 124b to their profiles so that facial recognition systems can be used by the camera 129 and/or audio control unit 116 to identify the headphone device based on the user wearing that device. Once the headphone device 124b is identified by the audio control unit 116, an initialization or calibration process may be performed in which the user wearing the headphone device 124b is prompted on one or more of the display devices 103, 109 and/or 111, or via audio transmitted to or generated by the headphone device 124b, to look at a particular location on the screen of the display device 103, 109 or 111. The user may then indicate with a remote control device or via an input module on the headphone device 124b that the user is looking at the particular location on the screen of the display (e.g. display device 103). The current direction or position of the user's eye captured by the camera 127b and/or 129 will be associated with the user looking at the particular location on the screen. Also, this current direction the user's eye is facing or position of the user's eye captured by the camera 127b and/or 129 may also be associated with a current position and/or position of the headphone device 124b (and thus a position and/or position of the user's head), gesture of the user, and/or location of the user, when the user is looking at that location on the display device 103. Alternatively, information indicative of the current position of the headphone device 124b (and thus a position and/or position of the user's head), gesture of the user, and/or location of the user may be used independently of or instead of the current direction the user's eye is facing or position of the user's eye to determine which display or location on a display the user is looking at. This initialization/calibration may be repeated for various other locations on the display(s) and at various times for increased accuracy and precision in determining which location on a display the user wearing headphone device 124b is currently looking at. For example, this initialization/calibration may be performed each time it is determined that the user has moved locations, or moved over a threshold amount. The calibration data may also be stored for subsequent use.

Determining the current position of the user's eyes, tracking eye movement, tracking the gaze of a user, determining the current position and/or location of the headphone device 124b (and thus a position and/or location of the head of the user wearing the headphone device 124b), and/or determining which display device 103, 109 and/or 111, or location on the display device 103, 109 and/or 111, the user is currently looking at may be performed in a variety of manners. These may include, but are not limited to: utilization of an accelerometer and/or gyroscope in the headphone device 124b (e.g., located in the headphone device controller 142); use of eye, head and/or motion tracking devices and systems on or in conjunction with the headphone device 124b such as, for example, the iView X™ Hi-Speed, iView X™ RED, iView X™ HED, and/or X™ Hi-Speed Primate systems, and/or components thereof; other eye & gaze tracking systems or the like; global positioning systems (GPS); motion sensors; beacons, etc. Such eye, gaze, head and/or motion tracking devices, or applicable components thereof, may also or instead be utilized on, in or in conjunction with, the audio control unit 116; display device 103, 109 and/or 111; camera 129 and/or receiving device 131; other eye & gaze tracking systems or the like; global positioning systems (GPS); motion sensors; beacons, etc.

For a user to provide commands to receiving device 131 (and/or a television receiver), buttons (or other input components) may be present on headphone devices 124a, 124b. Therefore, to send a command to receiving device 131 requesting a channel change, a user may push a button on headphone device 124a, 124b while a particular video stream is selected (e.g., the user is looking at the particular video stream). In some embodiments, a device separate from headphone devices 124a, 124b may be used by users to provide feedback. Mobile devices 112a, 112b may represent remote controls or mobile wireless devices, such as cellular phones.

Mobile devices 112a, 112b may represent an IR, RF, or some other form of remote control. Such a remote control may be linked with the corresponding headphone device. For instance, mobile device 112a may be linked with headphone device 124a. Therefore, a command received by receiving device 131 from mobile device 112a may be known to correspond to headphone device 124a. In other embodiments, a user's mobile phone may be used as a form of remote control. For such embodiments, a user may install an application on the mobile device that allows for interaction with receiving device 131. Communication between a mobile device and receiving device 131 may involve use of a wireless local area network (e.g., a WIFI network) to either communicate directly or via the Internet with receiving device 131 or the mobile device using a cellular network to communicate with receiving device 131 via the Internet. In such embodiments, a user may be permitted to specify via the application which piece of content the user is watching (an identifier may be presented identifying each screen) and the user may specify a command (e.g., channel change, pause, rewind) via the application. Alternatively, the user may only specify the command, while the screen which the user is watching may be determined based on the user's gaze, head movements/user gestures, voice commands, or interactions with headphone devices 124a, 124b.

The controller 130 of the audio control unit 116 may use RAM 137 in a conventional fashion, for volatile storage of instructions, data, etc. The controller 130 may store data indicative of, or otherwise regarding a direction the user is currently looking at; a particular display device 103, 109, or 111, and/or a location on a particular display device 103, 109, or 111 the user is currently looking at; data corresponding to the particular configurations of the headphone devices 124a and 124b; configuration data related to the display device 103, 109, and/or 111; the codec of the audio sources 138; and/or audio data or signals associated with pieces of content being displayed on screen A 105, screen B 107, Screen C and/or Screen D, etc. The audio sources 138 include graphics circuitry and/or instructions stored on a computer-readable medium to encode/decode or otherwise generate, select and/or communicate audio signals in the manners described herein.

For example, the control input and output components 132 are configured to control the transmitting of the first electrical signal representing the audio stream associated with the piece of content 107 and transmitting of a second electrical signal representing the audio stream associated with the piece of content 105 at any given time and, in some embodiments, to also send and receive control signals and data to be received by wireless receivers and/or transceivers (e.g., located in the headphone device controller 142), and/or located in the camera 129. In some embodiments, the camera 129 may be located or connected to other devices including, but not limited to: display device 103, 109 and/or 111; receiving device 131; audio control unit 116; a mobile device (not shown); a smart phone (not shown); a tablet device (not shown); other personal computing devices; smart appliances; etc. The output components 132 may be those configured to send signals via communication channels or communication channels 118a, 118b and/or 118c. Such signals may include, may use or may be based on, but are not limited to, one or more of: an infrared (IR) signal, consumer electronics infrared protocols, RC-5 IR protocol, RC-6 IR protocol, the R-Step IR protocol, NEG TC101 IR protocol, a radio frequency (RF) or other electromagnetic signal, a Digital Light Processing Link (DLP® Link) signal, an IEEE 802.15.4 ("ZIGBEE"), a "RUBEE" wireless protocol, a wireless local area network (WLAN), IEEE 802.15.1 ("BLUETOOTH"), IEEE 802.11 ("WI-FI"), a High-Definition Multimedia Interface (HDMI) Consumer Electronics Control (CEC) signal, personal area network(s), etc. In some embodiments, the camera 129 may be connected to receiving device 131 or other media player device that generates one or more piece of content signals for display on screen A 105, screen B 107, Screen C and/or Screen D and/or audio signal and is positioned in view of the user such that the current direction the user is looking may be determined. This may include the camera 129 capturing information indicative of one or more of: a position of the user's head, a position of the user's eyes, a direction in which the user's eyes are looking, movements of the user, movements of the user's eyes and gestures of the user.

In FIG. 1, two headphone devices, four screens on three display devices, and two mobile devices are illustrated. It should be understood that the number of such devices are merely exemplary. For instance, embodiments of system 100 may include only two screens (e.g., a single display device subdivided into two regions), two display devices, or more than three display devices. Similarly, fewer or greater numbers of headset devices and/or mobile devices may be present in other embodiments.

Figure 2:
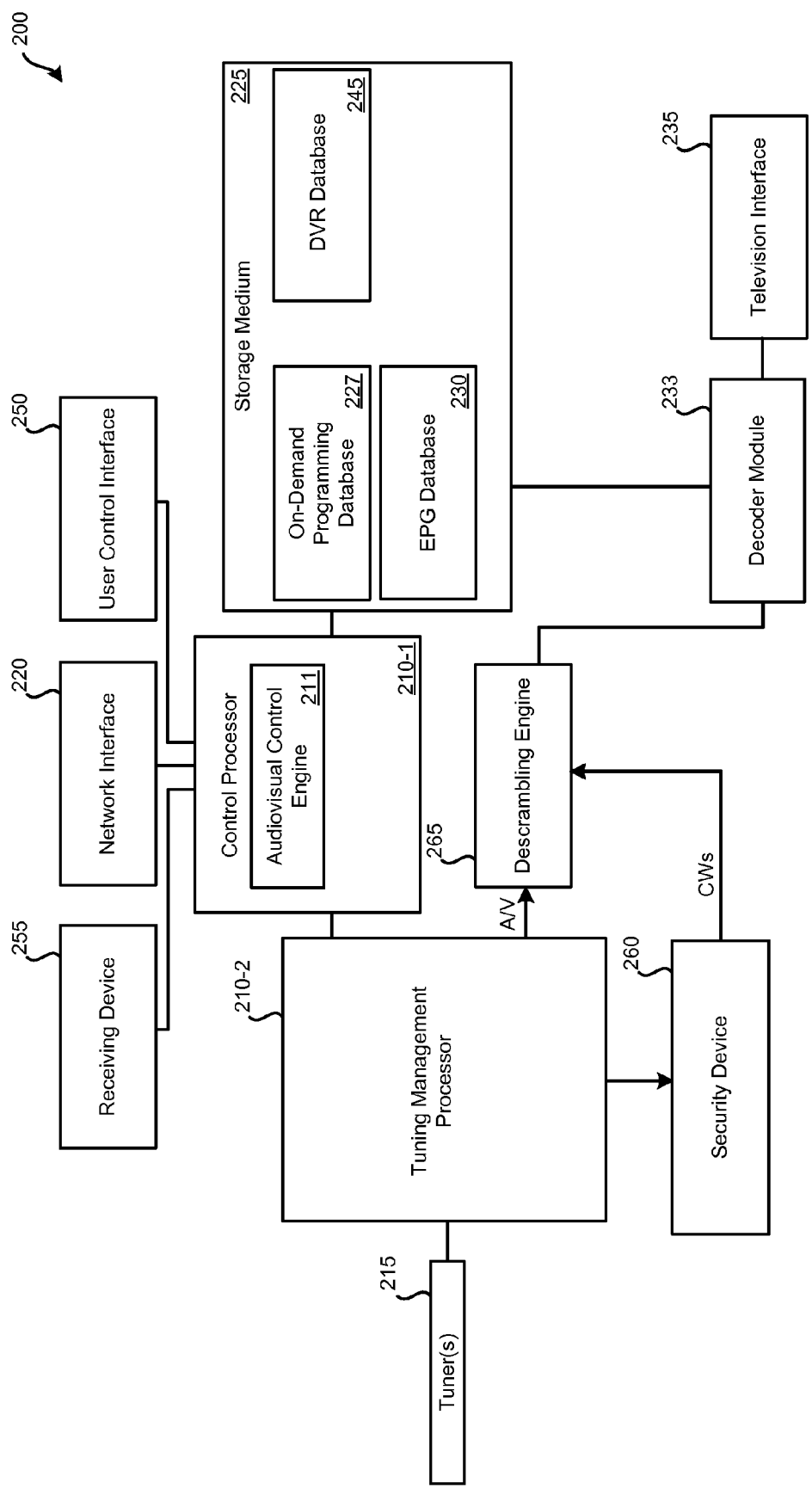
FIG. 2 illustrates an embodiment of a television receiver.

FIG. 2 illustrates an embodiment of a television receiver. A receiving device, such as receiving device 131, may be incorporated as part of television receiver 200 or may be in communication with television receiver 200. For example, television receiver 200 may output multiple video streams to one or more display devices. Each audio stream for the multiple video streams may be provided to the receiving device, which distributes to one or more headset devices. The television receiver may receive commands (e.g., channel change commands) from the receiving device or may receive commands from users directly.

Television receiver 200 may be in the form of a separate device configured to be connected with one or more display devices, such as televisions. Embodiments of television receiver 200 can include set top boxes (STBs). In addition to being in the form of an STB, a television receiver may be incorporated as part of another device, such as a television, other form of display device, video game console, computer, mobile phone or tablet or the like. For example, a television may have an integrated television receiver (which does not involve an external STB being coupled with the television).

Television receiver 200 may be incorporated as part of a television, such as display devices 103, 109, and 111 of FIG. 1. Television receiver 200 may include: processors 210 (which may include control processor 210-1, tuning management processor 210-2, and possibly additional processors), tuners 215, network interface 220, non-transitory computer-readable storage medium 225, electronic programming guide (EPG) database 230, television interface 235, digital video recorder (DVR) database 245 (which may include provider-managed television programming storage and/or user-defined television programming), on-demand programming database 227, remote control interface 250, security device 260, and/or descrambling engine 265. In other embodiments of television receiver 200, fewer or greater numbers of components may be present. It should be understood that the various components of television receiver 200 may be implemented using hardware, firmware, software, and/or some combination thereof. Functionality of components may be combined; for example, functions of descrambling engine 265 may be performed by tuning management processor 210-2. Further, functionality of components may be spread among additional components.

Processors 210 may include one or more specialized and/or general-purpose processors configured to perform processes such as tuning to a particular channel, accessing and displaying EPG information from EPG database 230, and/or receiving and processing input from a user. It should be understood that the functions performed by various modules of FIG. 2 may be performed using one or more processors. As such, for example, functions of descrambling engine 265 may be performed by control processor 210-1.

Control processor 210-1 may communicate with tuning management processor 210-2. Control processor 210-1 may control the recording of television channels based on timers stored in DVR database 245. Control processor 210-1 may also provide commands to tuning management processor 210-2 when recording of a television channel is to cease. In addition to providing commands relating to the recording of television channels, control processor 210-1 may provide commands to tuning management processor 210-2 that indicate television channels to be output to decoder module 233 for output to a display device. Control processor 210-1 may control how many video streams are provided to individual display devices, which may be defined based on user preferences. Control processor 210-1 may also communicate with network interface 220 and remote control interface 250. Control processor 210-1 may handle incoming data from network interface 220 and remote control interface 250. Additionally, control processor 210-1 may be configured to output data via network interface 220.

Control processor 210-1 may include an audiovisual control engine 211, which manages output of audio streams corresponding to the currently output video streams to receiving device 255. Audiovisual control engine 211 may output an interface via television interface 235 that facilitates user interactions with receiving device 255 and audiovisual control engine 211.

Tuners 215 may include one or more tuners used to tune to transponders that include broadcasts of one or more television channels. In some embodiments, two, three, or more than three tuners may be present, such as four, six, or eight tuners. Each tuner contained in tuners 215 may be capable of receiving and processing a single transponder stream from a satellite transponder (or from a cable network) at a given time. As such, a single tuner may tune to a single transponder stream at a given time. If tuners 215 include multiple tuners, one tuner may be used to tune to a television channel on a first transponder stream for display using a television, while another tuner may be used to tune to a television channel on a second transponder for recording and viewing at some other time. If multiple television channels transmitted on the same transponder stream are desired, a single tuner of tuners 215 may be used to receive the signal containing the multiple television channels for presentation and/or recording. Tuners 215 may receive commands from tuning management processor 210-2. Such commands may instruct tuners 215 which frequencies are to be tuned to. In some embodiments, the key combination database (and/or remote control lock rules 247) are stored and processed by the remote control.

Network interface 220 may be used to communicate via an alternate communication channel with a television service provider, if such communication channel is available. The primary communication channel may be via satellite (which may be unidirectional to television receiver 200) and the alternate communication channel (which may be bidirectional) may be via a network, such as the Internet. Data may be transmitted from television receiver 200 to a television service provider system and from the television service provider system to television receiver 200. Information may be transmitted and/or received via network interface 220. For instance, instructions from a television service provider may also be received via network interface 220, if connected with the Internet. Network interface 220 may also be used to communicate with mobile devices of users, such as mobile devices 112*a* and 112*b* via a local wireless network, the Internet, and/or a cellular network.

Storage medium 225 may represent one or more non-transitory computer-readable storage mediums. Storage medium 225 may include memory and/or a hard drive. Storage medium 225 may be used to store information received from one or more satellites, via a cable network, via some other form of television service provider network, and/or information received via network interface 220. Storage medium 225 may store information related to EPG database 230, DVR database 245, and/or on-demand programming 227. Recorded television programs may be stored using storage medium 225 as part of DVR database 245. Storage medium 225 may be partitioned or otherwise divided (such as into folders) such that predefined amounts of storage medium 225 are devoted to storage of television programs recorded due to user-defined timers and stored television programs recorded due to provider-defined timers.

EPG database 230 may store information related to television channels and the timing of programs appearing on such television channels. EPG database 230 may be stored using storage medium 225, which may be a hard drive or solid-state drive. Information from EPG database 230 may be used to inform users of what television channels or programs are popular and/or provide recommendations to the user. Information from EPG database 230 may provide the user with a visual interface displayed by a television that allows a user to browse and select television channels and/or television programs for viewing and/or recording. Information used to populate EPG database 230 may be received via network interface 220, via satellite, or some other communication link with a television service provider (e.g., a cable network). Updates to EPG database 230 may be received periodically. EPG database 230 may serve as an interface for a user to control DVR functions of television receiver 200, and/or to enable viewing and/or recording of multiple television channels simultaneously. Information from EPG database 230 may be output as a video stream to a display device. A particular user may issue commands indicating that an EPG interface be presented. For instance, referring to FIG. 1, screen B 107 may be used to present an EPG from EPG database 230. A user issuing a command that an EPG be displayed may constitute a change command.

Decoder module 233 may serve to convert encoded video and audio into a format suitable for output to a display device. For instance, decoder module 233 may receive MPEG video and audio from storage medium 225 or descrambling engine 265 to be output to a television. MPEG video and audio from storage medium 225 may have been recorded to DVR database 245 as part of a previously-recorded television program. Decoder module 233 may convert the MPEG video and audio into a format appropriate to be displayed by a television or other form of display device and audio into a format appropriate to be output from speakers, respectively. Decoder module 233 may have the ability to convert a finite number of television channel streams received from storage medium 225 or descrambling engine 265, simultaneously. For instance, decoders within decoder module 233 may be able to only decode a single television channel at a time. Decoder module 233 may have various numbers of decoders.

Television interface 235 may serve to output a signal to a television (or another form of display device) in a proper format for display of video and playback of audio. As such, television interface 235 may output one or more television channels, stored television programming from storage medium 225 (e.g., television programs from DVR database 245, television programs from on-demand programming 230 and/or information from EPG database 230) to a television for presentation. Television interface 235 may also serve to output a CVM. Television interface 235 may be configured to be connected with multiple display devices. Therefore, different video feeds may be presented via different display devices. Television interface 235 may also be configured to output multiple (e.g., 2, 3, 4, 5, 6, etc.) video streams to a single display device for simultaneous presentation.

Digital Video Recorder (DVR) functionality may permit a television channel to be recorded for a period of time. DVR functionality of television receiver 200 may be managed by control processor 210-1. Control processor 210-1 may coordinate the television channel, start time, and stop time of when recording of a television channel is to occur. DVR database 245 may store information related to the recording of television channels. DVR database 245 may store timers that are used by control processor 210-1 to determine when a television channel should be tuned to and its programs recorded to DVR database 245 of storage medium 225. In some embodiments, a limited amount of storage medium 225 may be devoted to DVR database 245. Timers may be set by the television service provider and/or one or more users of television receiver 200.

DVR database 245 may also be used to record recordings of service provider-defined television channels. For each day, an array of files may be created. For example, based on provider-defined timers, a file may be created for each recorded television channel for a day. For example, if four television channels are recorded from 6-10 PM on a given day, four files may be created (one for each television channel). Within each file, one or more television programs may be present. The service provider may define the television channels, the dates, and the time periods for which the television channels are recorded for the provider-defined timers. The provider-defined timers may be transmitted to television receiver 200 via the television provider's network. For example, in a satellite-based television service provider system, data necessary to create the provider-defined timers at television receiver 200 may be received via satellite. Content from DVR database 245 may be output as a video stream to a display device. A particular user may issue commands indicating that recorded content be presented. For instance, referring to FIG. 1, screen A 105 may be used to present recorded content as a video stream (with the associated audio stream also output). A user issuing a command that recorded content be played back, such a command may constitute a change command.

As an example of DVR functionality of television receiver 200 being used to record based on provider-defined timers, a television service provider may configure television receiver 200 to record television programming on multiple, predefined television channels for a predefined period of time, on predefined dates. For instance, a television service provider may configure television receiver 200 such that television programming may be recorded from 7 to 10 PM on NBC, ABC, CBS, and FOX on each weeknight and from 6 to 10 PM on each weekend night on the same channels. These channels may be transmitted as part of a single transponder stream such that only a single tuner needs to be used to receive the television channels. Packets for such television channels may be interspersed and may be received and recorded to a file. If a television program is selected for recording by a user and is also specified for recording by the television service provider, the user selection may serve as an indication to save the television program for an extended time (beyond the time which the predefined recording would otherwise be saved). Television programming recorded based on provider-defined timers may be stored to a portion of storage medium 225 for provider-managed television programming storage.

DVR Database 245 may also store television programming that is recorded based on analysis of one or more users. For instance, if a user frequently watches and/or records sports, a major sporting event may be selected by control processor 210-1 for recording based on a profile associated with the user. The day of the week, channel, and/or time of previously set timers may also be used to record television programming. For instance, if a user has previously set a timer to record television channel five at 8 PM on Thursdays, control processor 210-1 may set a timer for this same day of the week, channel, and time for some point in the future (even though the user has not specifically selected it).

On-demand programming database 227 may store additional television programming. On-demand programming database 227 may include television programming that was not recorded to storage medium 225 via a timer (either user- or provider-defined). Rather, on-demand programming may be programming provided to the television receiver directly for storage by the television receiver and for later presentation to one or more users. On-demand programming may not be user-selected. As such, the television programming stored to on-demand programming database 227 may be the same for each television receiver of a television service provider.

Remote control interface 250 may receive communications from one or more remote controls (physically separate from television receiver 200) that allow a user to interact with television receiver 200. Remote control interface 250 may receive and send received commands to control processor 210-1, which may then process the commands using audiovisual control engine 211. In some embodiments, it may be possible to load some or all preferences to a remote control. As such, the remote control can serve as a backup storage device for the preferences. In such embodiments, the communication link with the remote control via remote control interface 250 is bidirectional. Remote control interface 250 may be configured to receive commands from one or more remote controls, such as mobile devices 112a, 112b. Remote control interface 250 may receive commands via BLUETOOTH, NFC, an IR-implemented protocol, an RF-implemented protocol, or some other communication protocol.

Security device 260, which may be implemented as a smart card, may be used for decrypting incoming data. The decrypted data may be used by descrambling engine 265 for descrambling video and/or audio. Descrambled video and/or audio may be output by descrambling engine 265 to storage medium 225 for storage (in DVR database 245) and/or to decoder module 233 for output to a television or other presentation equipment via television interface 235.

Tuning management processor 210-2 may be in communication with tuners 215 and control processor 210-1. Tuning management processor 210-2 may be configured to receive commands from control processor 210-1. Such commands may indicate when to start/stop receiving and/or recording of a television channel and/or when to start/stop causing a television channel to be output to a television. Tuning management processor 210-2 may control tuners 215. Tuning management processor 210-2 may provide commands to tuners 215 that instruct the tuners which satellite, transponder, and/or frequency to tune to. From tuners 215, tuning management processor 210-2 may receive transponder streams of packetized data.

For simplicity, television receiver 200 of FIG. 2 has been reduced to a block diagram; commonly known parts, such as a power supply, have been omitted. Further, some routing between the various modules of television receiver 200 has been illustrated. Such illustrations are for exemplary purposes only. The state of two modules not being directly or indirectly connected does not indicate the modules cannot communicate. Rather, connections between modules of the television receiver 200 are intended only to indicate possible common data routing. It should be understood that the modules of television receiver 200 may be combined into a fewer number of modules or divided into a greater number of modules. Further, the components of television receiver 200 may be part of another device, such as built into a television. Television receiver 200 may include one or more instances of various computerized components, such as disclosed in relation to computer system 600 of FIG. 6.

While the television receiver 200 has been illustrated as a satellite receiver, it is to be appreciated that techniques below may be implemented in other types of television receiving devices, such as cable receivers, terrestrial receivers, IPTV receivers or the like. In some embodiments, the television receiver 200 may be configured as a hybrid receiving device, capable of receiving content from disparate communication networks, such as satellite and terrestrial television broadcasts. In some embodiments, the tuners may be in the form of network interfaces capable of receiving content from designated network locations. Further, as previously detailed, the electronic device that interacts with the remote control may be some other type of device entirely. For example, a receiver may have audiovisual control engine 211.

Figure 3:
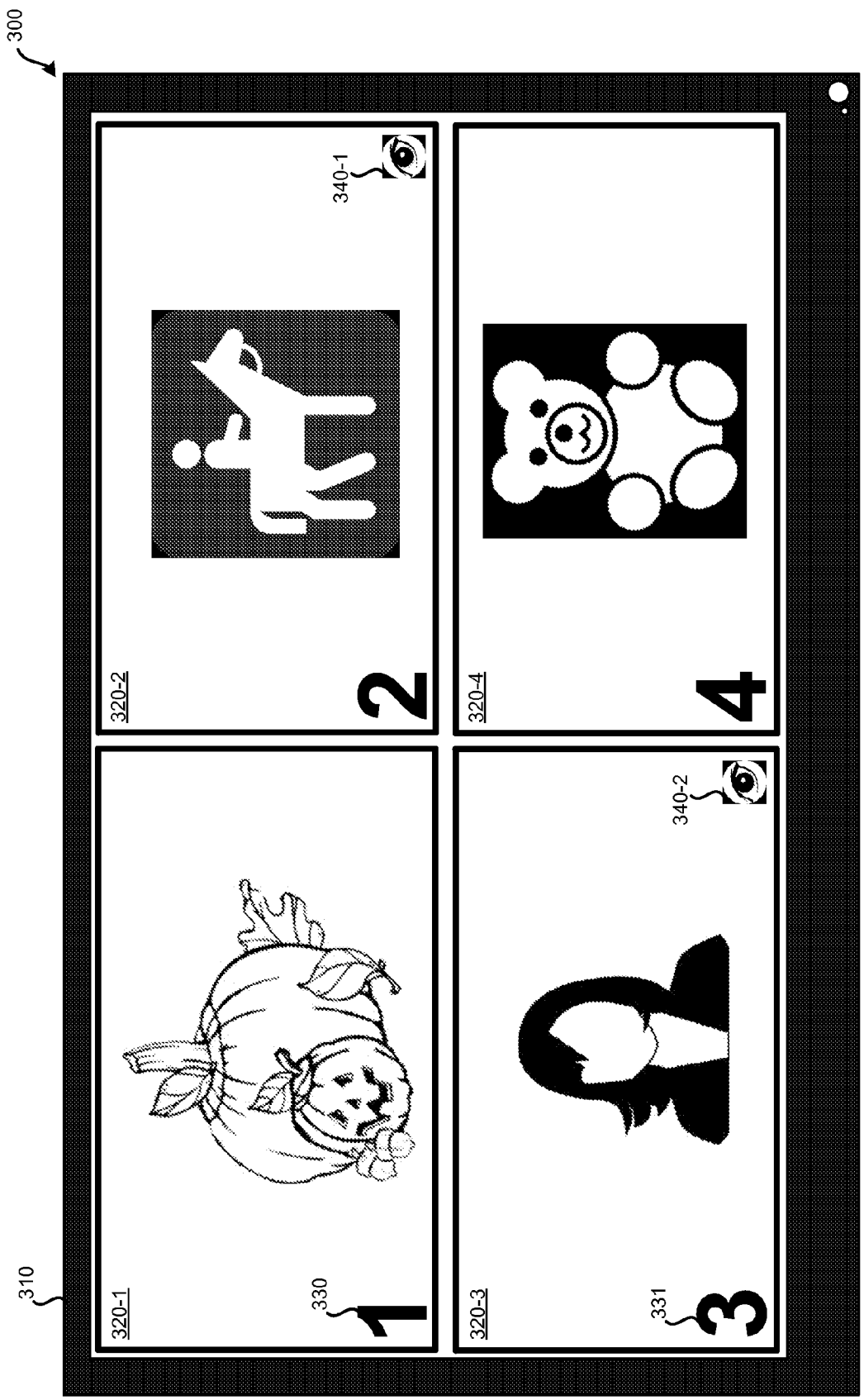
FIG. 3 illustrates an embodiment of an output of an audiovisual presentation system to a display device.

FIG. 3 illustrates an embodiment of an output of an audiovisual presentation interface to display device. Such an audiovisual presentation interface may be output to a display device (e.g., a television) by a receiving device (as detailed in relation to FIG. 1) and/or by a television receiver (as detailed in relation to FIG. 2). The illustrated embodiment 300 of FIG. 3 contains a single display device divided up into 4 regions or quadrants (in the case of four regions). It should be understood, such an arrangement is merely exemplary: the display device 310 may be divided up into a fewer or greater number of regions and/or multiple display devices may be used for presenting pieces of content. Further, the exemplary graphics displayed are only for illustration so that different pieces of content are presented.

Display device 310 is divided up into 4 regions. Each region may present a different piece of content. Each piece of content presented by display device 310 may be viewed by zero, one, or more than one user simultaneously. Graphical indicators 340 indicate which pieces of content 320 are currently being viewed by a user. Such graphical indicators may be displayed by display device 310 based on output from a receiving device or a television receiver. Graphical indicators 340 may serve to alert users to pieces of content 320 that other users are viewing. Alternatively, graphical indicators 340 may not be displayed, rather the receiving device or television receiver may maintain a status of which pieces of content 320 are currently being viewed (e.g., based on which audio streams are being output to headsets associated with users). In some embodiments, graphical indicators 340 may be displayed while being manipulated (e.g., moved among display regions).

In illustrated embodiment 300, a first user is viewing piece of content 320-2 as indicated by graphical indicator 340-1. Similarly, a second user is viewing piece of content 320-3 as illustrated by graphical indicator 340-2. The presence of a graphical indicator of graphical indicators 340 may be indicative of one or more users viewing the associated piece of content. For instance, single graphical indicator 340-1 may be presented in relation to piece of content 320-2 based on one or more users currently viewing piece of content 320-2. In some embodiments, each graphical indicator of graphical indicators 340 may be indicative of a single user viewing a particular piece of content. Therefore, if multiple users are viewing a particular piece of content, multiple graphical indicators may be presented in relation to the viewed piece of content. In some embodiments, graphical indicators 340 are specific to users, therefore the graphical indicators may appear different for different users, thus allowing the content viewed by a particular user to be identified by other users.

In relation to each display region, which may be a quadrant, an identifier may be present. Identifier 330 identifies the display region of piece of content 320-1. Such an identifier may be used by a user to select a particular piece of content. For example, a user viewing piece of content 320-2, and, thus receiving the audio stream associated with piece of content 320-2, may desire to instead view and listen to the audio stream associated with piece of content 320-1. To do so, the user may provide input indicating that the user desires to view and listen to piece of content 320-1 instead of piece of content 320-2. In some embodiments this may be done by the user looking at piece of content 320-1. In other embodiments, the user may provide input indicative of identifier 330. For example, on a headphone device, remote control, or via an application on a mobile device, the user may provide identifier 330 to select piece of content 320-1 such that the user receives the audio stream associated with piece of content 320-1. Additionally or alternatively, the user may be able to navigate to piece of content 320-1 (e.g., by moving graphical indicator 340-1) via arrow keys on a headphone device, remote control, or mobile device. The user may also perform a gesture which may be sensed by an accelerometer of a headphone device to indicate that the user desires to receive the audio stream associated with piece of content 320-1 instead of the audio stream associated with piece of content 320-2.

In illustrated embodiment 300, assume only two users are viewing display device 310. A first user is indicated by graphical indicator 340-1 who is viewing piece of content 320-2; a second user as indicated by graphical indicator 340-2 is viewing piece of content 320-3. Via a user input device, which may be a headphone device, remote control, a mobile device, or some other device through which the user can provide input, each of these users may be permitted to issue change commands to the receiving device or television receiver for controlling the pieces of content output to display device 310. Since only the second user is viewing piece of content 320-3, the second user may be permitted to change piece of content 320-3 to some other piece of content or change the status of piece of content 320-3. Changing the piece of content 320-3 may involve the second user issuing a channel up, channel down, channel change command, selecting a piece of stored content for playback, selecting on-demand content for playback, beginning a videogame, or activating an EPG. Changing the status of the piece of content may involve fast forwarding, rewinding, stopping, or performing some other function that interrupts playback of piece of content 320-3. The second user may be permitted to alter the piece of content output in relation to identifier 331 because the second user is the only user viewing piece of content 320-3. Similarly, the user associated with graphical indicator 340-1 may be permitted to perform change commands on piece of content 320-2 because the user is the only user viewing this piece of content. When changing a piece of content for presentation, a user may be prohibited from selecting a piece of content for presentation that is already presented in another display region and an audiovisual indicator can alert the user so that the user can determine where to find the current programming channel being displayed.

Figure 4:
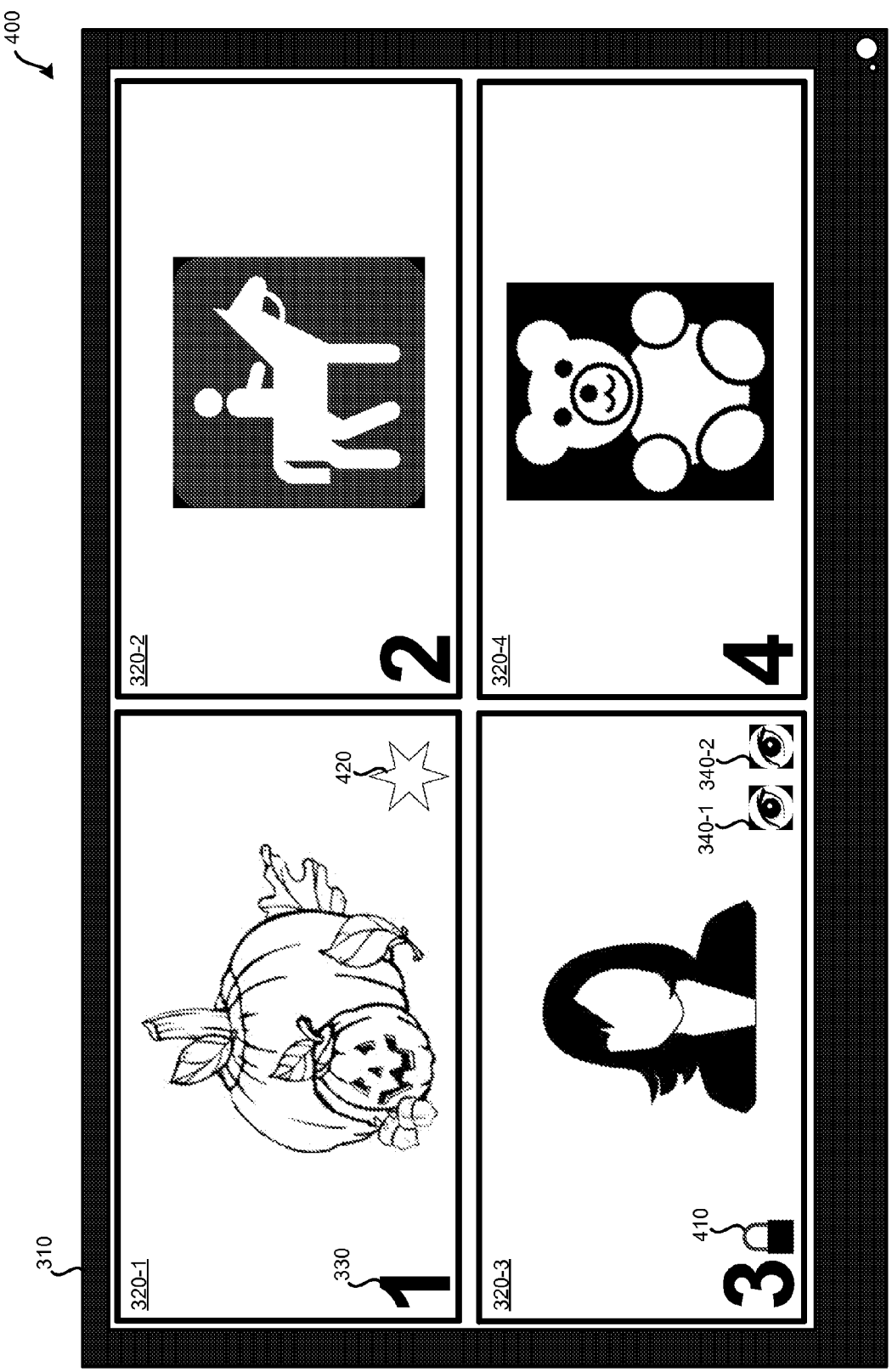
FIG. 4 illustrates another embodiment of an output of an audiovisual presentation system to a display device.

FIG. 4 illustrates an embodiment 400 of an output of an audiovisual presentation interface to a display device. Such an audiovisual presentation interface may be output to a display device (e.g., a television) by a receiving device (as detailed in relation to FIG. 1) and/or by a television receiver (as detailed in relation to FIG. 2). In embodiment 400, display device 310 is presenting two graphical indicators 340 in relation to piece of content 320-3. As indicated by the two graphical indicators (which may or may not be presented by display device 310) a first user and the second user are viewing piece of content 320-3 and each receiving the associated audio stream. If one of the user's attempts to change piece of content 320-3 by issuing a change command to the television receiver and/or receiving device in communication with display device 310, the change command may be blocked. This block may occur because another user is currently viewing and receiving the audio feed associated with piece of content 320-3. In response to receiving the change command, the receiving device or the television receiver may output an indication of the multiple users are viewing piece of content 320-3, such as graphical indicators 340. In some embodiments, a graphical indicator 410 may be presented that serves to notify the user that attempted the change commands that while the command has been received, execution of the command has been blocked. In the illustrated embodiment, graphical indicator 410 is a lock indicating that piece of content 320-3 cannot be changed to a different piece of content (e.g., a different channel). In some embodiments, whenever a piece of content is locked, graphical indicator 410 may be displayed. In other embodiments, graphical indicator 410 may only be displayed in relation to a piece of content when a user attempts to perform a change command and the change command is received but blocked from execution.

If such a command is blocked from being performed in relation to a particular display region, such as the display region associated with piece of content 320-3, an indication may be presented that alerts the user that attempted the command of the display region to which the command could be applied without the command being blocked from execution. Graphical indicator 420 may alert the user that piece of content 320-1 is not being watched and/or listened to by any user, and thus can be changed. In some embodiments, rather than graphical indicator 420, graphical indicator 410, and/or graphical indicators 340 being presented by display device 310, such graphical indications or other forms of indications may be presented by a mobile device with which the user is interacting. For instance, an application being executed by a user device may present a representation of display device 310 to the user with identifiers such as identifier 330 for each display region and may also include graphical indicators having meanings similar to graphical indicators 410, 340, and 420. It should be understood that while various symbols are illustrated in FIGS. 3 and 4 for use as the different types of graphical indicators, these symbols are merely exemplary. Different graphical indicators may be used or text may be used instead.

Figure 5:
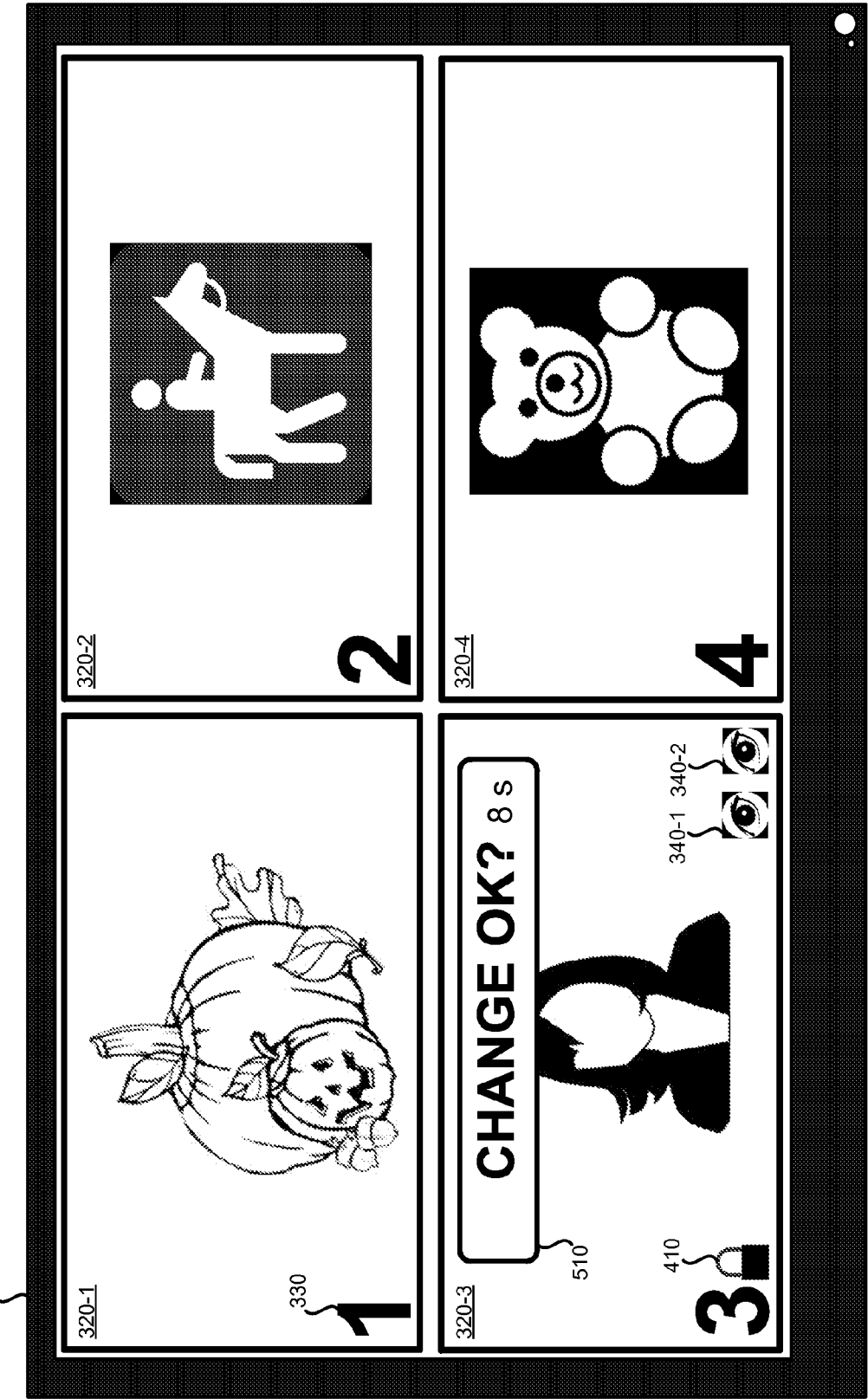
FIG. 5 illustrates another embodiment of an output of an audiovisual presentation system to a display device.

FIG. 5 illustrates another embodiment 500 of an output of an audiovisual presentation interface to display device. Such an audiovisual presentation interface may be output to a display device (e.g., a television) by a receiving device (as detailed in relation to FIG. 1) and/or by a television receiver (as detailed in relation to FIG. 2). In embodiment 500, similar to embodiment 400, two users, as indicated by graphical indicator 340-1 and graphical indicator 340-2, are both viewing piece of content 320-3 and listening to the associated audio stream. In embodiment 500, one of these users has issued a change command in relation to the portion of the display related to piece of content 320-3. While, in embodiment 400, the change command was blocked because another user was also viewing piece of content 320-3, in embodiment 500, the change command will be executed if the other user (or users) viewing piece of content 320-3 does not block the command. For instance, if the change command indicated that another channel should be presented in place of piece of content 320-3, a block request 510 may be presented that provides the other user viewing piece of content 320-3 an opportunity to provide input blocking the change request for a predefined amount of time. If each of the one or more users responds that the change request is okay, the piece of content 320-3 may be changed irrespective of it being viewed by multiple users. By default, no response from the one or more other users may constitute acceptance of the change request. If the one or more other users provide user input (via a headphone device, a mobile device, or a remote control) indicative of denying the change request, piece of content 320-3 may remain presented as is.

In some embodiments, rather than the block request 510 being presented in relation to piece of content 320-3 by display device 310, block request 510 may be presented to the users viewing piece of content 320-3 via a mobile device or headphone device. If presented via the headphone device, the block request 510 may be auditory, such as a prerecorded statement of "Is it OK to change the channel?" The user may respond by pushing a button on the headphone device, or gesturing, such as by shaking his head yes or no, or voice response by speaking "yes" or "no" to a microphone of the headphones. The user may also respond to such an auditory change request via a remote control or a mobile device.

Figure 6:
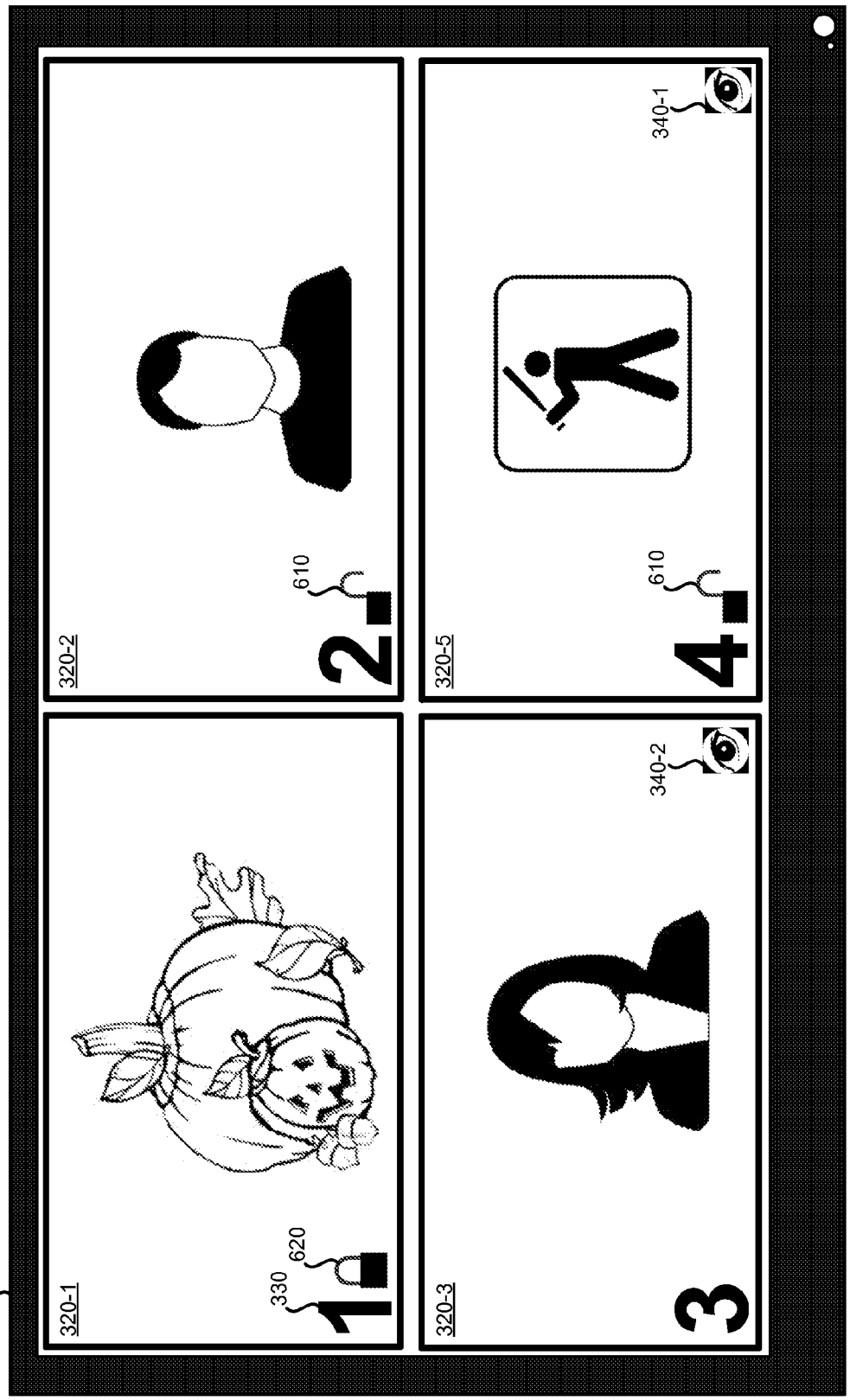
FIG. 6 illustrates another embodiment of an output of an audiovisual presentation system to a display device.

FIG. 6 illustrates an embodiment 600 of an output of an audiovisual presentation system to display device. Such an audiovisual presentation interface may be output to a display device (e.g., a television) by a receiving device (as detailed in relation to FIG. 1) and/or by a television receiver (as detailed in relation to FIG. 2). In embodiment 600, a first user is viewing piece of content 320-5 as illustrated by graphical indicator 340-1. A second user is viewing piece of content 320-3 as indicated by graphical indicator 340-2.

In some embodiments, a piece of content may be locked for display such that it cannot be changed via change command from a user despite not being viewed by any user (with a headphone device). For instance, a bar may always want to have a local sports event displayed even if no user who is wearing a headphone device is actively listening to the local sports event (one possible reason may be that persons without a headphone device are watching the event). In embodiment 600, piece of content 320-1 has been locked for presentation such that a change command from a user does not affect output of piece of content 320-1. Graphical indicator 620, which is only exemplary, indicates as such. Graphical indicator 620 may only be presented if a user attempts to change piece of content 320-1 via a change command or graphical indicator 620 may always be displayed in relation to piece of content 320-1 by display device 310. A master user, such as an administrator with special privileges, may be the only user permitted to modify whether a particular piece of content, such as piece of content 320-1, is subject to a lock regardless of viewership.

In illustrated embodiment 600, graphical indicators 610 illustrate pieces of content that are eligible to be changed via a change command. In embodiment 600, the user associated with graphical indicator 340-1 has changed piece of content 320-4 to piece of content 320-5 via a change command (e.g., a channel change command). For at least a period of time after issuing the change command that caused piece of content 320-4 to cease being displayed and piece of content 320-5 to start being displayed (along with the associated change in output audio stream), the user associated with graphical indicator 340-1 may retain the abilities to change piece of content 320-5 again regardless of if another user begins watching and listening to piece of content 320-5. As such, the user associated with graphical indicator 340-1 may "flip through" television channels without being forced to stop by another user beginning to watch piece of content 320-5. For example, after a change command has been executed, the user who issued the command may be permitted to change the piece of content again within 10 seconds (or some other shorter or longer period of time) regardless of other users selecting piece of content 320-5 to receive the associated audio stream.

Figure 7:
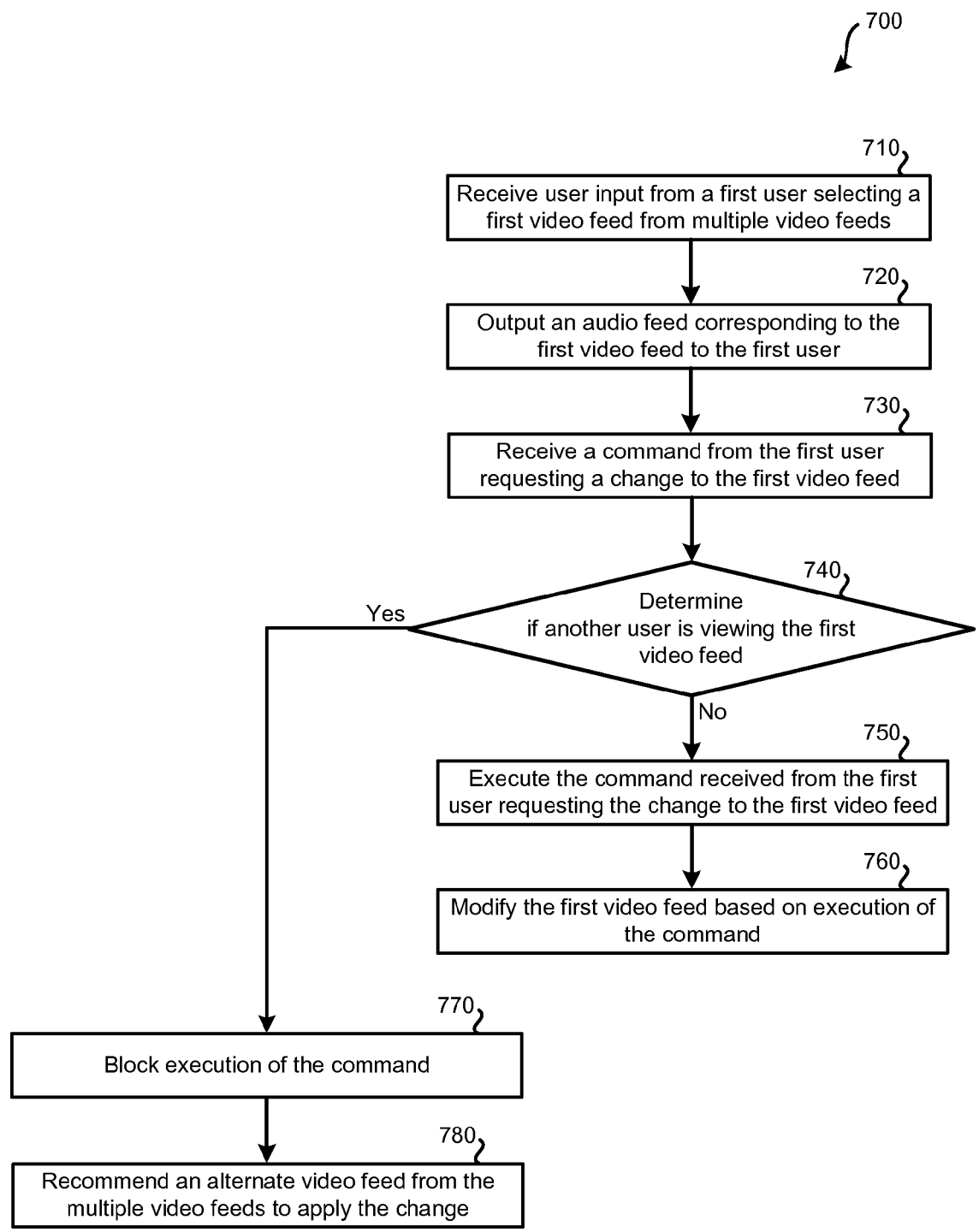
FIG. 7 illustrates an embodiment of a method for managing multiple video streams.

The system of FIG. 1, the television receiver of FIG. 2, and the interfaces of FIGS. 3-6 may be used in performing various methods. FIG. 7 illustrates an embodiment of a method for managing multiple video streams. The steps of method 700 may be performed using a receiving device in combination with one or more headset devices, mobile devices, and/or remote controls. Method 700 may also involve the use of a television receiver (into which the receiving device may be incorporated). Method 700 may use one or more display devices, such as televisions, on which video is presented to one or more users. The receiving device, television receiver, headphone device(s), mobile device(s), and/or remote control(s) may be computerized and contain some or all of the components as detailed in relation to FIG. 9.

At step 710, user input may be received from a first user that selects a first video feed that is presenting a first piece of content from multiple video feeds. The user input may be received and/or processed by the receiving device or the television receiver. These multiple video feeds may be presented via one or more display devices connected with a television receiver, the television receiving having an integrated or separate receiving device. The user input may be in the form of button pushes (on a headphone device or remote control), gestures (e.g., sensed by a mobile device or by the headphone device), voice commands via a microphone of the headphone device, eye movements (e.g., sensed by a camera of the receiving device, mobile device or by the headphone device), or input provided via a mobile device. The user input selects a particular video feed and the associated audio feed that the user desires to view and listen to.

At step 720, the audio feed corresponding to the selected video feed is output to the headphone device of the first user. The audio feed for each of the multiple video streams may be provided by the television receiver to the receiving device. The receiving device may provide the appropriate audio stream to the first user. This may include a wireless communication between a receiving device, such as receiving device 131, and headphone devices, such as headphone device 124a, 124b. The audio feed of the first video feed may continue to be provided to the user via the headphone device until the user provides user input requesting a change. At step 730, a change command may be received based on user input that requests a change to the first video feed. This change command may request a different television channel be presented instead of the first video feed or a different piece of stored content be presented.

At step 740, it may be determined, such as by the receiving device, whether another user is also viewing the first video stream. It may be determined whether another user is viewing the first video stream based on whether another user is currently receiving the audio stream associated with the first video stream. If no, this means that the first user is the only user viewing the first video stream and, thus, changing the first video stream will not negatively affect the viewing experience of another user. If no other user is viewing the first video stream, method 700 may proceed to step 750 from step 740.

At step 750, the change command received from the first user at step 730 may be executed. This change command may result in the first video feed being changed to a different piece of content and the associated audio feed changing based on the newly selected piece of content. The first video feed may be modified at step 760 by presenting a second piece of content instead of the first piece of content. The video feed may now differ such that other video or a graphical interface (e.g., an EPG) may be presented in the display region previously occupied by the first video feed of the first piece of content. A second video feed of a second piece of content may be presented instead. If associated audio is available, this second audio stream may be output to the first user's headphone device. Other users, if any, who have selected a different video feed for viewing, would remain unaffected.

If another user is viewing the first video stream, method 700 may proceed to step 770 from step 740. At step 770, due at least in part to another user viewing the first video feed (determined based on this other user receiving the audio feed associated with the first video feed), the execution of the command received at step 730 may be blocked. Therefore, the change command may not be executed. The first user may receive feedback, such as via the display device, headphone device, mobile device, or remote control indicating that the change command will not be performed. In some embodiments, an indication of why the change command will also not be performed is provided. In some embodiments, an indication of which other user is viewing the first video feed is provided.

At step 780, a recommendation may be made to the first user of an alternate video feed that can be changed to a different piece of content instead of the first video feed. This feedback may be provided via the display device, headphone device, mobile device, or remote control. For instance, a location of a cursor controlled by the first user may be moved to select a video feed not being viewed by any other user instead of the first video feed.

Figure 8:
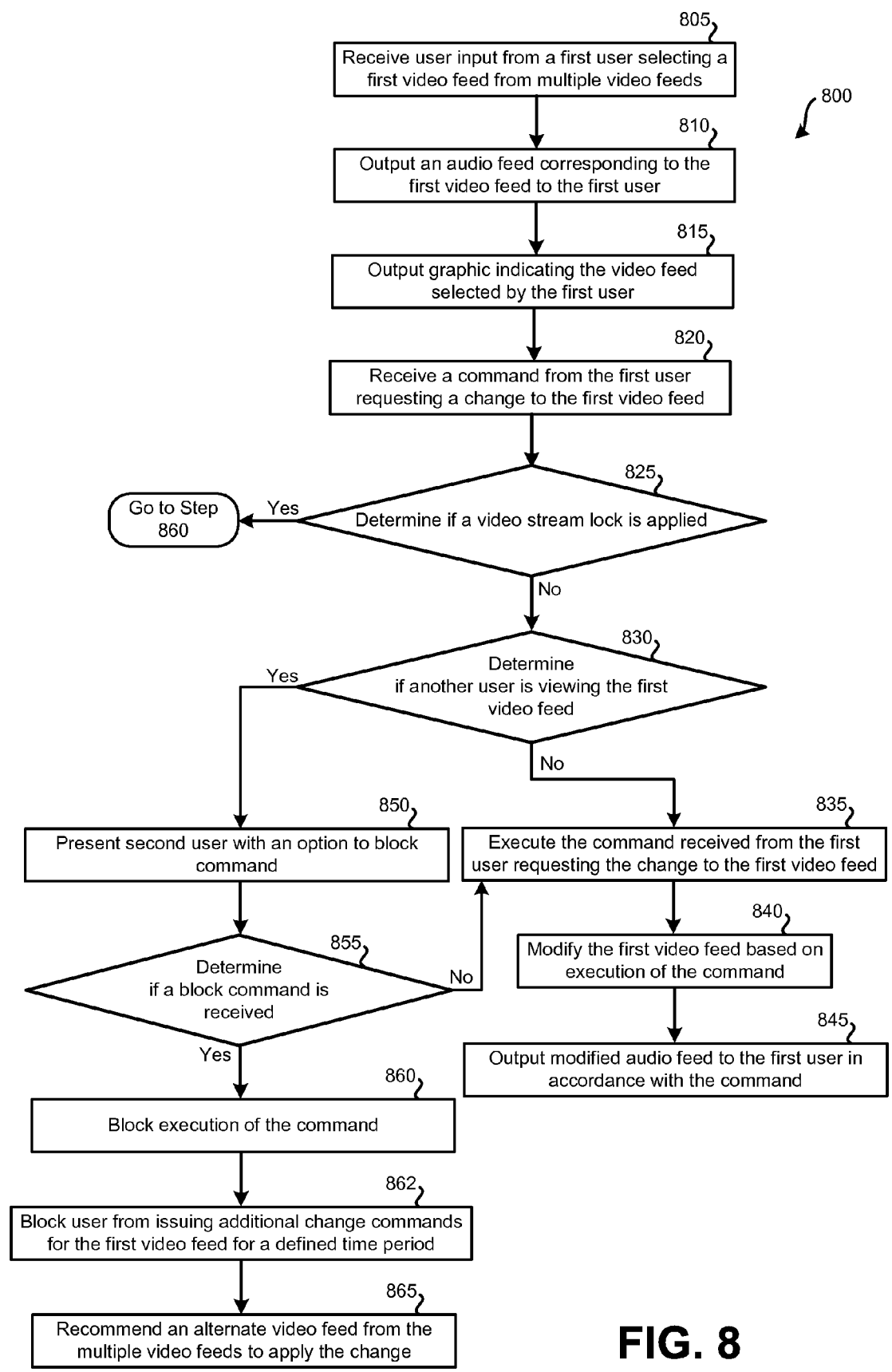
FIG. 8 illustrates an embodiment of a method for managing multiple video streams.

FIG. 8 illustrates an embodiment of a method for managing multiple video streams. The steps of method 800 may be performed using a receiving device in combination with one or more headset devices, mobile devices, and/or remote controls. Method 800 may also involve the use of a television receiver (into which the receiving device may be incorporated). Method 800 may use one or more display devices, such as televisions, on which video is presented to one or more users. The receiving device, television receiver, headphone device(s), mobile device(s), and/or remote control(s) may be computerized and contain some or all of the components as detailed in relation to FIG. 9. Method 800 may represent a more detailed embodiment of method 700 of FIG. 7. As such, steps from method 800 are interchangeable with steps of method 700.

At step 805, user input may be received from a first user that selects a first video feed that is presenting a first piece of content from multiple video feeds. The user input may be received and/or processed by the receiving device or the television receiver. These multiple video feeds may be presented via one or more display devices connected with a television receiver, the television receiver having an integrated or separate receiving device. The user input may be in the form of button pushes (on a headphone device or remote control), gestures (e.g., sensed by a mobile device or by the headphone device), eye movements (e.g., sensed by a camera of the receiving device, mobile device or by the headphone device), or input provided via a mobile device. The user input selects a particular video feed and the associated audio feed that the user desires to view and listen to.

At step 810, the audio feed corresponding to the piece of content of the selected video feed is output to the headphone device of the first user. The audio feed for each of the multiple video streams may be provided by the television receiver to the receiving device. The receiving device may provide the appropriate audio stream to the first user. This may include a wireless communication between a receiving device, such as receiving device 131, and headphone devices, such as headphone device 124a, 124b. The audio feed of the first video feed may continue to be provided to the user via the headphone device until the user provides user input requesting a change.

The user input may manipulate a graphical indicator associated with the user at step 815. For instance, this graphical indicator may be presented in relation to a video feed. Referring to FIG. 3, graphical indicator 340-1 may be associated with the first user and can be moved from video feed to video feed to indicate which piece of content the user desires to view and listen to. In some embodiments, such a graphical indicator may be presented on a mobile device or remote control being used by the user, or only when an action is performed.

At step 820, a change command may be received based on user input that requests a change to the first video feed. This change command may request a different television channel be presented instead of the first video feed or a different piece of stored content be presented. In some embodiments, not all commands may qualify as change commands. Commands that are not change commands may be permitted to be executed regardless of whether a video stream is locked or if another user is watching the piece of content of the video stream. Which commands qualify as change commands may be defined by the television service provider and, possibly, may be modified by the administrator of the receiving device or television receiver. Table 1 indicates exemplary classification of commands. If the command received is not a change command, method 800 may proceed to step 835. If the command is a change command, method 800 may proceed to step 825.

TABLE 1

| Command Type | Classified as Change Command? |
|---|---|
| Channel Change | Yes |
| Pause | No |
| Stop | Yes |
| Full EPG Display | Yes |
| Info Display (e.g., partial screen EPG summary for piece of content) | No |
| Rewind/Fast Forward | Yes |

At step 825, it may be determined whether the first video feed is locked. Such a lock may be set by an administrator of the receiving device or television receiver. For instance, regardless of whether a user is listening to the audio associated with a video stream, the administrator may have locked the video stream so that a user cannot use a change command to affect the video stream. For example, a bar may want a local sporting event to be presented regardless of whether a user is currently watching and listening to it. This may also be useful if someone is watching the video stream who does not have a headphone device. Additionally, such a video stream may be associated with an audio stream that is played aloud in location such that a headphone device is not necessary to hear the audio stream. If a video stream lock is present for the first video stream, method 800 may proceed to step 860. If the video stream lock is not applied to the first video stream, method 800 may proceed to step 830.

At step 830, it may be determined, such as by the receiving device, whether another user is also viewing the first video stream. It may be determined whether another user is viewing the first video stream based on whether another user is currently receiving the audio stream associated with the first video stream. If no, this means that the first user is the only user viewing the first video stream and, thus, changing the first video stream will not negatively affect the viewing experience of another user. If no other user is viewing the first video stream, method 800 may proceed to step 835 from step 830.

At step 835, the change command received from the first user at step 820 may be executed. This change command may result in the first video feed being changed to a different piece of content and the associated audio feed changing based on the newly selected piece of content. The first video feed may be modified at step 840 by presenting a second piece of content instead of the first piece of content. The video feed may now differ such that other video or a graphical interface (e.g., an EPG) may be presented in the display region previously occupied by the first video feed of the first piece of content. A second video feed of a second piece of content may be presented instead. If associated audio is available, this second audio stream may be output to the first user's headphone device at step 845. Other users, if any, who have selected a different video feed for viewing, would remain unaffected.

If one or more other users are viewing the first video stream, method 800 may proceed to step 850 from step 830. At step 850, the one or more other users may have the ability to block the first user's change command. A response within a predefined amount of time, such as ten seconds, (e.g., via headphone device, via mobile device, via eye movement, or via remote control) may allow these one or more other users to block the first user's change command. In some embodiments, a majority of the consensus of other users may be required to block the first user's change command. In other embodiments, as long as one other user blocks the user's change command, the change command will be blocked.

Such settings may be defined by the television service provider and/or an administrator of the television receiver. By default, if no response is received from the one or more other users, a block command may be determined to not be present (or, in some embodiments, to be present). A notification to prompt the one or more other users for the block command may be auditory (e.g., via a headphone device) or visual (e.g., via a mobile device or via the display device presenting the first video stream).

If no block command is received, method 800 may proceed to step 835 from step 855. If a block command is received, method 800 may proceed to step 860 from step 855. At step 860, due at least in part to one or more other users blocking the change command, the execution of the command received at step 820 may be blocked. Therefore, the change command may not be executed. The first user may receive feedback, such as via the display device, headphone device, mobile device, or remote control indicating that the change command will not be performed. In some embodiments, an indication of why the change command will also not be performed is provided. In some embodiments, an indication of which other user is viewing the first video feed is provided.

In some embodiments, after the command issued by the user is blocked, the user may be blocked from issuing any additional change commands for the same video feed for a defined period of time at step 862. This defined period of time may be predefined time period, such as ten minutes. In some embodiments, the defined period of time may be the remainder of the currently presented piece of content. The end of the piece of content may be determined based on EPG data or when playback of a recorded piece of content is complete.

At step 865, a recommendation may be made to the first user of an alternate video feed that can be changed to a different piece of content instead of the first video feed. For example, referring to FIG. 6, graphical indicators, such as graphical indicators 610, may indicate video streams that are available to be changed. This feedback may be provided via the display device, headphone device, mobile device, or remote control. For instance, a location of a cursor controlled by the first user may be moved to select a video feed not being viewed by any other user instead of the first video feed.

Figure 9:
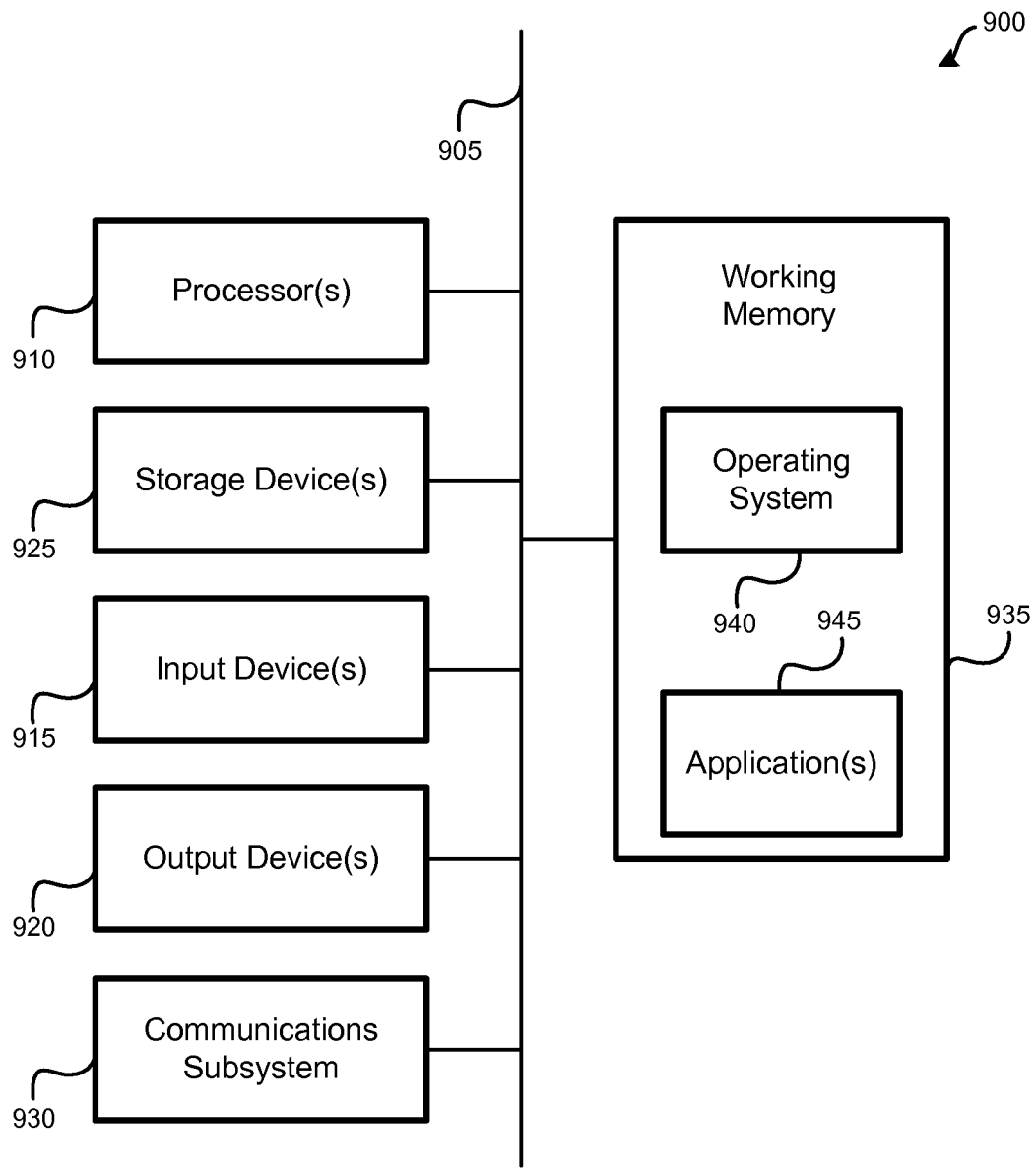
FIG. 9 illustrates an embodiment of a computer system.

A computer system as illustrated in FIG. 9 may be incorporated as part of the previously described computerized devices, such as the headphone devices, mobile devices, receiving devices, and/or television receivers. FIG. 9 provides a schematic illustration of one embodiment of a computer system 900 that can perform various steps of the methods provided by various embodiments. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner.

The computer system 900 is shown comprising hardware elements that can be electrically coupled via a bus 905 (or may otherwise be in communication, as appropriate). The hardware elements may include one or more processors 910, including without limitation one or more general-purpose processors and/or one or more special-purpose processors (such as digital signal processing chips, graphics acceleration processors, video decoders, and/or the like); one or more input devices 915, which can include without limitation a mouse, a keyboard, remote control, and/or the like; and one or more output devices 920, which can include without limitation a display device, a printer, and/or the like.

The computer system 900 may further include (and/or be in communication with) one or more non-transitory storage devices 925, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 900 might also include a communications subsystem 930, which can include without limitation a modem, a network card (wireless or wired), an infrared communication device, a wireless communication device, and/or a chipset (such as a Bluetooth™ device, an 802.11 device, a WiFi device, a WiMax device, cellular communication device, etc.), and/or the like. The communications subsystem 930 may permit data to be exchanged with a network (such as the network described below, to name one example), other computer systems, and/or any other devices described herein. In many embodiments, the computer system 900 will further comprise a working memory 935, which can include a RAM or ROM device (e.g., corresponding to RAM 137 and/or ROM 136), as described above.

The computer system 900 also can comprise software elements, shown as being currently located within the working memory 935, including an operating system 940, device drivers, executable libraries, and/or other code, such as one or more application programs 945, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 925 described above. In some cases, the storage medium might be incorporated within a computer system, such as computer system 900. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 900 and/or might take the form of source and/or installable code, which, upon compilation and/or installation on the computer system 900 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 900) to perform methods in accordance with various embodiments of the invention. According to a set of embodiments, some or all of the procedures of such methods are performed by the computer system 900 in response to processor 910 executing one or more sequences of one or more instructions (which might be incorporated into the operating system 940 and/or other code, such as an application program 945) contained in the working memory 935. Such instructions may be read into the working memory 935 from another computer-readable medium, such as one or more of the non-transitory storage device(s) 925. Merely by way of example, execution of the sequences of instructions contained in the working memory 935 might cause the processor(s) 910 to perform one or more procedures of the methods described herein. Processor(s) 910 may correspond to controller 130 of FIG. 1.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 900, various computer-readable media might be involved in providing instructions/code to processor(s) 910 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 925. Volatile media include, without limitation, dynamic memory, such as the working memory 935.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 910 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 900.

The communications subsystem 930 (and/or components thereof) generally will receive signals, and the bus 905 then might carry the signals (and/or the data, instructions, etc. carried by the signals) to the working memory 935, from which the processor(s) 910 retrieves and executes the instructions. The instructions received by the working memory 935 may optionally be stored on a non-transitory storage device 925 either before or after execution by the processor(s) 910.

It should further be understood that the components of computer system 900 can be distributed across a network. For example, some processing may be performed in one location using a first processor while other processing may be performed by another processor remote from the first processor. Other components of computer system 900 may be similarly distributed. As such, computer system 900 may be interpreted as a distributed computing system that performs processing in multiple locations. In some instances, computer system 900 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. An audiovisual control system, the audiovisual control system comprising:
   a receiving device configured to:
   receive a first command selecting a first video feed of a plurality of video feeds that a first user is viewing on a display device;
   based on the first command, output a first audio feed that corresponds to the first video feed the first user is viewing, wherein the first audio feed is output to a first headphone device;
   receive a second command indicative of a change command from the first user corresponding to the first video feed;
   determine whether a second user is viewing the first video feed;

in response to determining whether the second user is viewing the first video feed, process the change command;
receive a third command indicative of a second video feed of the plurality of video feeds that the second user is viewing on the display device; and
based on the third command, output a second audio feed that corresponds to the second video feed the second user is viewing, wherein the second audio feed is output to a second headphone device.

2. The audiovisual control system of claim 1, the audiovisual control system further comprising:
a television receiver configured to:
output the plurality of video feeds for simultaneous presentation by the display device, wherein each video feed of the plurality of video feeds is displayed in a different display region of the display device.

3. The audiovisual control system of claim 2, wherein the receiving device is integrated in the television receiver.

4. The audiovisual control system of claim 1, wherein no other user is viewing the first video feed; and the receiving device is further configured to:
in response to determining that no other user is viewing the first video feed, change the first video feed to a new video feed based on the change command.

5. The audiovisual control system of claim 1, wherein the second user is viewing the first video feed; and the receiving device is further configured to:
in response to determining that the second user is viewing the first video feed, output an indication that the first video feed will not be changed based on the change command received from the first user.

6. The audiovisual control system of claim 1, wherein the second user is viewing the first video feed; and the receiving device is further configured to:
in response to determining that the second user is viewing the first video feed, discard the change command received from the first user.

7. The audiovisual control system of claim 1, the audiovisual control system further comprising:
the first headphone device configured to output audio to the first user wherein the first headphone device comprises a plurality of buttons, and the first headphone device is configured to:
receive, via a button of the plurality of buttons of the first headphone device, user input indicative of the first video feed of the plurality of video feeds; and
transmit the first command based on the user input.

8. The audiovisual control system of claim 1, the audiovisual control system further comprising:
a mobile device, configured to:
receive user input indicative of the first video feed of the plurality of video feeds; and
transmit the first command based on the user input to the receiving device via a network connection.

9. The audiovisual control system of claim 1, wherein the first headphone device comprises an accelerometer and the first headphone device is configured to:
receive, via the accelerometer, user input indicative of the first video feed of the plurality of video feeds; and
transmit the first command based on the user input.

10. The audiovisual control system of claim 1, the audiovisual control system further comprising:
a camera having a field of view including the first user, wherein a television receiver is further configured to:
receive one or more images from the camera; and
determine, using the one or more images, a display region of the display device that the first user is viewing; wherein the display region being viewed is used as the first command.

11. A method for managing multiple video streams, the method comprising:
receiving, by a computerized receiving device, a first command selecting a first video feed of a plurality of video feeds that a first user is viewing on a display device;
based on the first command, outputting, by the computerized receiving device, a first audio feed that corresponds to the first video feed the first user is viewing, wherein the first audio feed is output to a first headphone device;
receiving, by the computerized receiving device, a second command indicative of a change command from the first user corresponding to the first video feed;
determining, by the computerized receiving device, whether a second user is viewing the first video feed;
in response to determining whether the second user is viewing the first video feed, processing, by the computerized receiving device, the change command;
receiving, by the computerized receiving device, a third command indicative of a second video feed of the plurality of video feeds that the second user is viewing on the display device; and
based on the third command, outputting, by the computerized receiving device, a second audio feed that corresponds to the second video feed the second user is viewing, wherein the second audio feed is output to a second headphone device.

12. The method for managing multiple video streams of claim 11, the method further comprising:
output the plurality of video feeds for simultaneous presentation by the display device, wherein each video feed of the plurality of video feeds is displayed in a different display region of the display device.

13. The method for managing multiple video streams of claim 12, wherein the computerized receiving device is integrated as part of a television receiver.

14. The method for managing multiple video streams of claim 11, wherein no other user is viewing the first video feed; the method further comprising:
in response to determining that no other user is viewing the first video feed, changing, by the computerized receiving device, the first video feed to a new video feed based on the change command.

15. The method for managing multiple video streams of claim 11, wherein the second user is viewing the first video feed; and the method further comprising:
in response to determining that the second user is viewing the first video feed, outputting, by the computerized receiving device, an indication that the first video feed will not be changed based on the change command received from the first user.

16. The method for managing multiple video streams of claim 11, wherein the second user is viewing the first video feed; and the method further comprising:
in response to determining that the second user is viewing the first video feed, discarding, by the computerized receiving device, the change command received from the first user.

17. The method for managing multiple video streams of claim 11, the method further comprising:
receiving, by an accelerometer of the first headphone device, user input indicative of the first video feed of the plurality of video feeds; and transmitting, by the headphone device, the first command based on the user input.

18. A non-transitory processor-readable medium for managing multiple video streams, comprising processor-readable instructions configured to cause one or more processors to:
receive a first command selecting a first video feed of a plurality of video feeds that a first user is viewing on a display device;
based on the first command, output a first audio feed that corresponds to the first video feed the first user is viewing, wherein the first audio feed is output to a first headphone device;
receive a second command indicative of a change command from the first user corresponding to the first video feed;
determine whether a second user is viewing the first video feed;
in response to determining whether the second user is viewing the first video feed, process the change command;
receive a third command indicative of a second video feed of the plurality of video feeds that the second user is viewing on the display device; and
output, based on the third command, a second audio feed that corresponds to the second video feed the second user is viewing, wherein the second audio feed is output to a second headphone device.

* * * * *